UNITED STATES PATENT OFFICE.

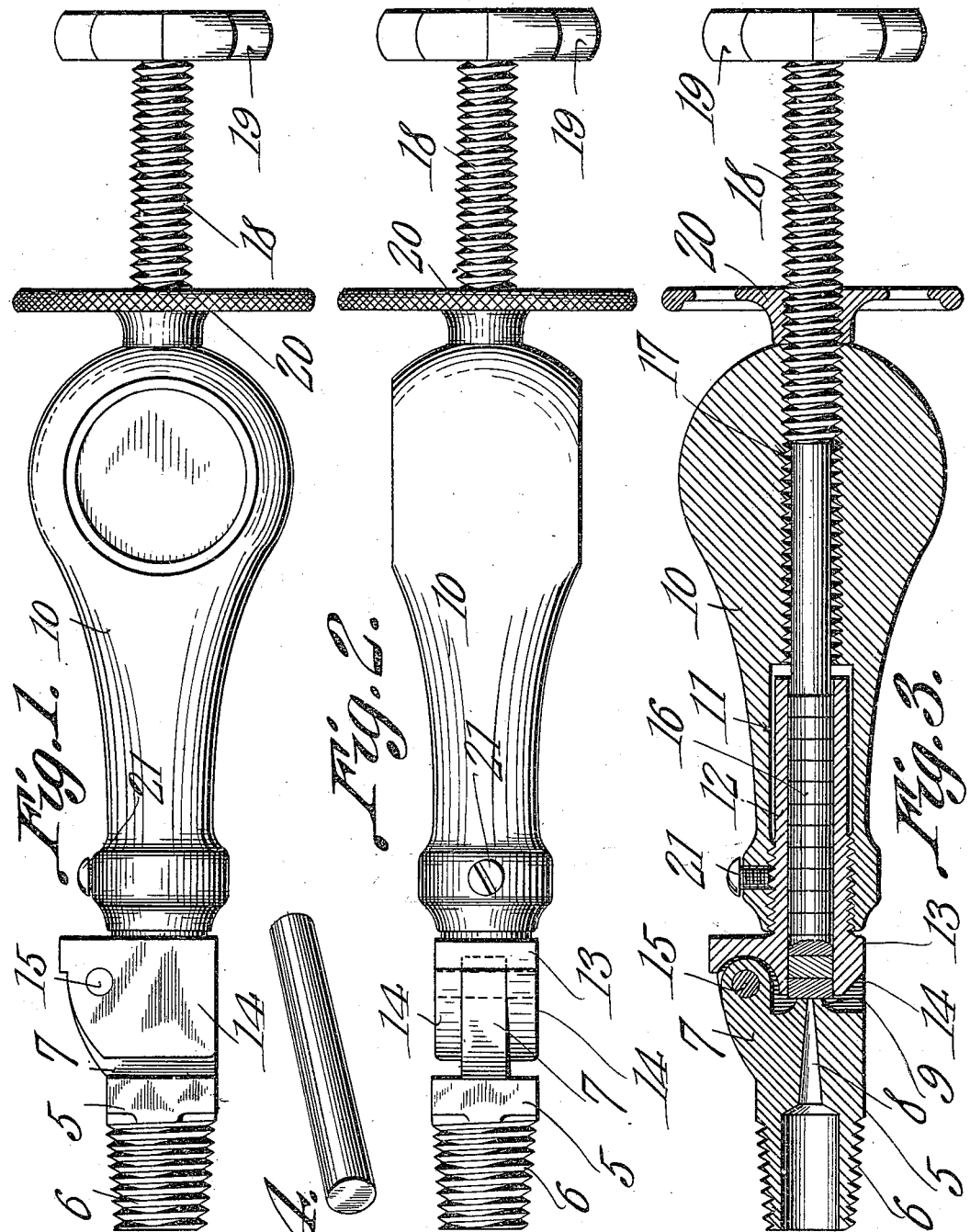

FRANK WALLACE LEIDECKER, OF MARIETTA, OHIO, ASSIGNOR OF ONE-EIGHTH TO CHARLES MOUNT, OF CARMEN, OHIO.

GAGE-COCK.

961,971.  Specification of Letters Patent.  Patented June 21, 1910.

Application filed January 31, 1910. Serial No. 541,140.

*To all whom it may concern:*

Be it known that I, FRANK W. LEIDECKER, a citizen of the United States, residing at Marietta, in the county of Washington and State of Ohio, have invented a new and useful Gage-Cock, of which the following is a specification.

This invention relates to gage cocks of that class in which a closure of the discharge orifice is effected by means of a weighted lever, and it is the object of the invention to provide the lever with a facing which is removable so that it may be renewed when worn.

The invention also has for its object to provide an improved holder for the facing, together with easily operated means for advancing the facing into working position, and also to arrange the holder so that it may be refilled while the pressure is on.

With the herein stated objects in view, the invention consists in a novel construction and arrangement of parts to be hereinafter described and claimed, and in order that the invention may be better understood, reference is had to the accompanying drawing, in which—

Figure 1 is a side elevation of a gage cock constructed in accordance with the present invention. Fig. 2 is a plan view. Fig. 3 is a central longitudinal section. Fig. 4 is a perspective view of a modified form of facing.

In the drawing, 5 denotes a nipple having a screw threaded portion 6 for attachment to the boiler, and a lug 7, through the outer end of which lug the discharge orifice 8 opens. A raised portion 9 surrounds the outlet end of the orifice, said raised portion serving as a seat for the closure.

At 10 is indicated the handle of the cock, the same being pivotally connected to the nipple 5, and enlarged at its free end to increase its weight, and thus hold the closure tightly seated, said closure being carried by the handle.

The handle 10 has a longitudinal bore 11, which bore, adjacent to the pivoted end of the handle, is screw threaded for a portion of its length. Into this bore screws a tube 12 which is formed at its outer end with a head 13 provided with ears 14 between which the lug 7 is received. A pin 15 passing through the lug and the ears pivotally connects the tube to the nipple.

The bore of the tube 12 opens through the head 13, and in this bore are located a plurality of disks 16, the tube therefore serving as a magazine for said disks. The outer one of the disks is adapted to project a short distance from the bore of the tube so that it may seat on the raised portion 9 surrounding the outlet end of the discharge orifice 8. The disks 16 may be made of leather, rubber or any other suitable packing material.

The bore 11 is continued through the free end of the handle, this portion of the bore being of reduced diameter, and screw threaded as indicated at 17, to receive a stem 18 which is in alinement with the bore of the tube 12, so that it may enter the same to advance the disks 16, as will be presently described. The stem has a screw threaded portion engageable with the threads 17, and it is also fitted, on the outside of the handle, with a hand wheel 19. On the projecting end of the stem 18 is mounted a lock nut 20 which, upon being screwed against the free end of the handle 10, locks the stem.

To prevent the handle 10 from turning on the tube 12, a screw 21 is provided which is threaded through the handle so as to engage the threaded portion of the tube, as shown in Fig. 3.

In operation, the stem 18 is screwed inwardly to project the outermost disk 16 a short distance from the tube 12, so that said disk may seat on the raised portion 9 surrounding the outlet end of the discharge orifice 8, and thus close the latter. When the disk becomes worn, the handle 10 is swung away from the discharge orifice, and the worn disk is pushed out of the tube by operating the stem 18, the latter being rotated in a direction to advance the disks in the tube. The inward movement of the stem is continued until the next disk projects a sufficient distance from the tube to close the discharge orifice, whereupon the handle is released, and permitted to swing back to closing position.

The length of the stem 18 is such that one or more of the disks 16 will remain in the tube 12 at the end of the inward movement of the stem. This enables the tube to be refilled with the pressure on, this refilling being effected by removing the handle 10 and inserting a new supply of disks into the tube 12 through the open rear end thereof. Instead of a plurality of disks as herein described and shown in Fig. 3 of the drawing, a rod of lead or other suitable soft metal may be substituted, which will be advanced by the stem 18 in the same manner as the disks when its projecting end wears away. Such a rod is illustrated in Fig. 4.

By the structure herein described, a gage cock is had which is effectually prevented from becoming leaky, as the disks can be at once removed when worn, and renewed. Removal is readily effected, a few turns of the hand wheel 19 being sufficient to push out the worn disk and to present a new one.

The preferred embodiment of the invention has been herein shown and described, but it will be apparent that various minor changes in the structural details may be resorted to without a departure from the invention. Furthermore the invention is not limited to gage cocks, but it may be applied to other valve structures.

What is claimed is:

1. In a gage cock, a member having a discharge orifice, a member having a longitudinal bore, a tube seating in one end of said bore, the tube and member being separably connected, a stem mounted in the other end of the bore, and adapted to enter the tube, a closure for the discharge orifice comprising a packing mounted in the tube, and means for operating the stem to advance the packing from the tube into position to seat on the discharge orifice.

2. In a gage cock, a member having a discharge orifice, a weighted member having a longitudinal bore, a tube seating in one end of said bore, and pivotally connected to the first mentioned member, the tube and weighted member being separably connected, a stem mounted in the other end of the bore, in alinement with the bore of the tube, and adapted to enter the same, a closure for the aforesaid discharge orifice comprising a packing mounted in the tube, and means for operating the stem to advance the packing from the tube into position to seat on the discharge orifice.

3. In a gage cock, a nipple, a lug projecting from the nipple, and having a discharge orifice, a tube having a head at one end, and formed with spaced ears between which the lug is received, the bore of the tube opening through the head, a pivot pin passing through the lug and the ears, a handle having a longitudinal bore in one end of which the tube is mounted, said tube and handle being removably connected, a stem mounted in the other end of the bore of the handle, and adapted to enter the bore of the tube, a closure for the discharge orifice comprising a packing mounted in the bore of the tube, and means for operating the stem to advance the packing from the tube into position to seat on the discharge orifice.

4. In a gage cock, a closure for the discharge orifice thereof, said closure comprising a magazine, a facing carried by the magazine, a weight removably connected to the magazine, and means carried by the weight for advancing the facing from the magazine into position to seat on the aforesaid discharge orifice.

In testimony that I claim the foregoing as my own, I have hereto affixed my signature in the presence of two witnesses.

FRANK WALLACE LEIDECKER.

Witnesses:
SEYMOUR J. HATHAWAY,
WM. H. EBINGER.